Patented May 25, 1926.

1,586,437

UNITED STATES PATENT OFFICE.

HARRY P. BASSETT, OF CYNTHIANA, KENTUCKY, AND THOMAS F. BANIGAN, OF PHILADELPHIA, PENNSYLVANIA, ASSIGNORS TO MEIGS, BASSETT & SLAUGHTER, INC., OF PHILADELPHIA, PENNSYLVANIA, A CORPORATION OF PENNSYLVANIA.

PROCESS OF MAKING ACETYLATED NITROCELLULOSE.

No Drawing. Application filed May 11, 1923. Serial No. 638,391.

This invention relates to a novel cellulose composition suitable for use in making artificial silk, artificial horse hair, artificial straw, celluloid like bodies, lacquers, photographic films, and other allied cellulose materials adapted for use in the arts.

Heretofore it has been attempted to produce an improved composition adapted for use in the production of artificial silk and the like by producing a mixture of nitrocellulose and acetyl cellulose but such mixture has certain disadvantages notably that of presenting difficulties in the production of clear, lustrous filaments of small size.

It also has been attempted to produce an improved composition for use in producing artificial silk and the like by the action of acetic anhydrid on nitrocellulose in the presence of a catalyzer but it has been found upon investigation that the process proposed is incapable of producing a chemical compound containing both nitro and acetyl groups in combination with the cellulose group but on the contrary the product contains a mixture of cellulose esters and the product therefore is subject to certain disadvantages notably that of not being capable of yielding upon being spun clear lustrous filaments of small size.

Now it is the primary object of our invention to produce an improved cellulose composition of the character above referred to having great strength and stability and low inflammability, which when denitrated will take dyes in the same manner as ordinary types of artificial silks, and when wet possesses an unusually high percentage of its strength when dry, and which will be free from the disadvantages of prior compositions intended for the same use.

We have found that this object is attained by a novel composition consisting wholly or chiefly of a compound containing both acetyl and nitro radicals combined with cellulose in one and the same ester molecule, the best results being obtained by the use of a substantially pure chemical compound containing nitro and acetyl groups combined with cellulose. From analysis it appears that the improved compound giving the best results is a diacetyl nitrocellulose although a considerable measure of practical success is obtained from other acetyl nitrocellulose than the diacetyl nitro compound.

A further object of this invention is to provide a satisfactory method for the production of the improved composition hereinbefore referred to.

In the production of our improved cellulose compound nitrocellulose of any degree of nitration according to the purpose for which the product is intended, is acetylated by the use of the customary acetylating reagents but at a low temperature preferably at about 0° C., and in no event as high as 15° C. The resulting acetyl nitrocellulose is separated from the excess acetylating solution by dissolving the latter in water, benzol or other suitable solvent. The remaining acetyl nitrocellulose is then washed and dried by any well known method as by first washing in the same solvent material as that used to dissolve the excess acetylating solution, then repeatedly washing in warm water, and finally drying at a temperature preferably below 50° C. The drying need not be continued until the product is absolutely dry. It may contain as high as about 15 or 20 per cent of water.

The washed and dried product is then dissolved in a sufficient quantity of a suitable solvent such as acetone or acetic anhydrid or a mixture of either of these solvents with acetic acid, to produce a viscous transparent solution suitable for spinning into filaments or being formed into other desired forms as straws, films and the like.

It is advantageous, although not absolutely necessary, to first dissolve the nitrocellulose in the acetylating solution minus the catalyst, so that the solution can be made at ordinary or elevated temperatures to hasten the solution of the nitrocellulose, the resulting solution being then cooled to below 15° C., and preferably to about 0° C., and the catalyst added to affect the acetylating reaction which as indicated must be conducted at a temperature below 15° C., and preferably at about 0° C.

In the preferred process of making our improved cellulose composition for use in producing artificial silk, artificial horse hair, artificial straw, lacquer, celluloid like bodies, films and like products, we dissolve nitrocellulose preferably of from about 6 to 12 per cent nitrogen content in a mixture containing from 50 to 60 per cent by weight of acetic acid and 40 to 50 per cent by weight of acetic anhydrid at ordinary or slightly elevated temperature preferably below 50° C. in the case of nitrocellulose of other than low nitrogen content although in the case of nitrocellulose of low nitrogen content such as nitrocellulose of less than 7 per cent nitrogen content, it is advisable, and in some cases necessary, to dissolve the nitrocellulose at higher temperatures and in the case of nitrocellulose of very low nitrogen content such as nitrocellulose of from about 1 to 4 per cent nitrogen content, it is advisable to effect the solution at about from 80° to 95° C.

The solution is then cooled to below 15° C., and preferably to about 0° C., and there is then added a suitable catalyst preferably sulfuric acid in the proportion of from one-tenth to five-tenths per cent by weight of the solution. The solution is then subjected to vigorous agitation and at the end of from about ten minutes to one hour the reaction ordinarily is complete and the resulting acetyl nitrocellulose is separated, washed and dried as hereinbefore described. The product is then dissolved and spun or otherwise formed into the desired form for use.

We have discovered that it is possible to avoid the steps of separating the acetyl nitrocellulose from the solution in which it is formed and then washing, drying and redissolving it, by adding to the solution in which such acetyl nitrocellulose is formed a suitable reagent such as a mixture of acetic acid and acetic anhydrid for diluting the thick, viscous jelly obtained as the result of the acetylating reaction to a viscosity suitable for spinning, and spinning the filaments or forming other forms direct from such diluted solution. The process based upon this discovery is not claimed herein but is the subject of a separate application.

Our improved product unlike acetyl cellulose and most forms of nitrocellulose and unlike mixtures of acetyl cellulose and nitrocellulose, is practically insoluble in cold glacial acetic acid. It also is insoluble in any mixture of ether and ethyl alcohol and has the further characteristic that when dissolved in a mixture of acetic acid and acetone or in a mixture of acetic anhydrid and acetic acid and introduced into cold water, the mass remaining after the extraction of the solvent by the water is a tough, transparent lustrous mass. The product is of great strength, stability and of low inflammability. When denitrated it will take dyes by the ordinary methods and when wet possesses a much higher percentage of its strength when dry than ordinary nitrocellulose silk, horse hair, straws and the like.

Our improved composition and filaments or other products produced therefrom can be denitrated by the usual denitration methods to render them substantially non-inflammable but its low inflammability renders it especially suitable for making certain products such as films and celluloid like bodies without denitration. In its practical use filaments, artificial horse hair, and artificial straw made therefrom would be denitrated, and all bodies made therefrom can be denitrated, but in the case of films and celluloid like bodies denitration is not necessary although in some cases desirable.

An important use for our improved composition is for addition to nitrocellulose or to acetyl cellulose or a mixture thereof to improve their spinning properties particularly in forming very fine filaments it having been found that the composition is very effective when so used even the addition of ten per cent by weight of our improved composition producing excellent results.

While we have described in detail the best method known to us of producing our improved cellulose composition it is to be understood that our invention is not limited thereto but that details of procedure and proportions of ingredients may be varied and that known equivalents of the materials employed may be used all without departure from the spirit of our invention or the scope of the appended claims.

Having described our invention, we claim:

1. The herein described process of producing a cellulose composition which comprises dissolving nitro-cellulose high in nitrogen content in a solvent adapted under the influence of a suitable catalyzer to acetylate the nitro-cellulose, cooling the solution to below 15° C., adding a suitable catalyzer to the cooled solution, and maintaining the solution at a temperature below 15° C. until acetyl nitro-cellulose is formed.

2. The herein described process of producing a cellulose composition which comprises dissolving nitro-cellulose high in nitrogen content in a mixture of acetic acid and acetic anhydride, acetylating it therein in the presence of a suitable catalyzer at a temperature below 15° C., and separating the resulting acetyl nitro-cellulose from the excess solvent.

3. The herein described process of producing a cellulose composition which comprises dissolving nitro-cellulose in a solvent adapted under the influence of a suitable catalyzer to acetylate the nitro-cellulose, cooling the solution to below 15° C., adding sulfuric acid in the proportion of from .1 to .5 per cent by weight of the solution, and maintaining the solution at a temperature below 15° C. until acetyl nitro-cellulose is produced.

4. The herein described process of producing a cellulose composition which comprises dissolving nitro-cellulose high in nitrogen content in a solvent adapted under the influence of a suitable catalyzer to acetylate the nitro-cellulose, cooling the solution to substantially 0° C., adding a suitable catalyzer to the cooled solution, and maintaining the solution at a temperature of substantially 0° C. until acetyl nitro-cellulose is produced.

5. The herein described process of producing a cellulose composition comprising dissolving nitro-cellulose high in nitrogen content in a mixture of acetic acid and acetic anhydride, acetylating it therein in the presence of a suitable catalyzer at a temperature of substantially 0° C., and separating the resulting acetyl nitro-cellulose from the excess solvent.

In testimony whereof, we affix our signatures.

HARRY P. BASSETT.
THOMAS F. BANIGAN.